(No Model.)
C. H. ALAPAW.
CALIPERS.
No. 311,800. Patented Feb. 3, 1885.
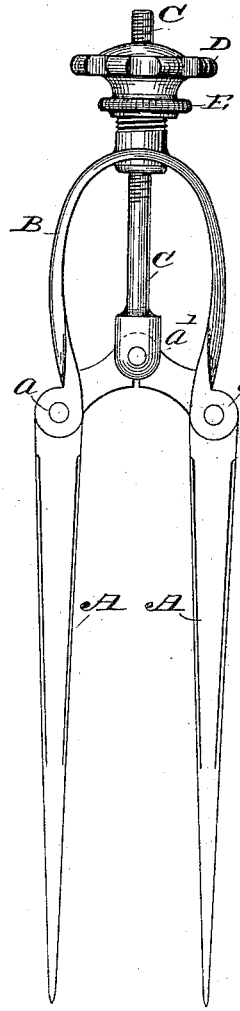
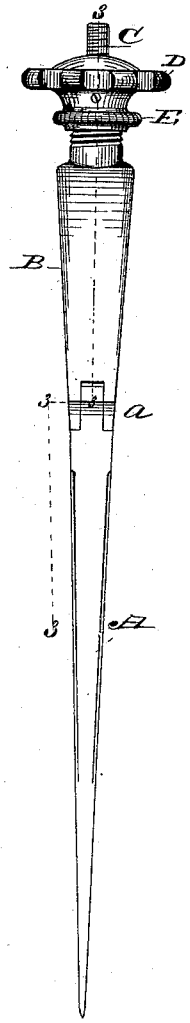
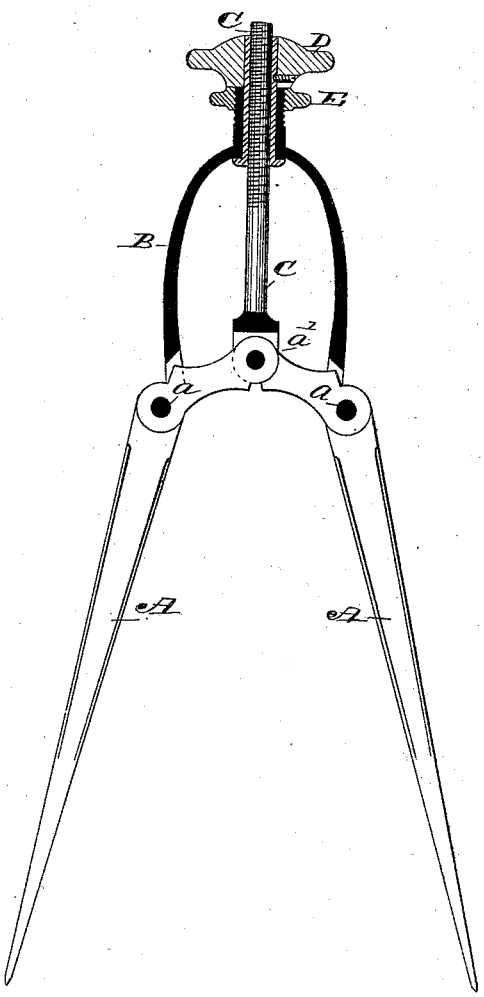
Attest:
Charles Pickles,
C. S. Biser
Inventor:
Charles H. Alapaw
by C. D. Moody
atty

United States Patent Office.

CHARLES H. ALAPAW, OF ST. LOUIS, MISSOURI, ASSIGNOR OF TWO-THIRDS TO JOHN G. BRINKMEYER AND FREDERICK A. BRINKMEYER, BOTH OF SAME PLACE.

CALIPERS.

SPECIFICATION forming part of Letters Patent No. 311,800, dated February 3, 1885.

Application filed September 20, 1884. (No model.)

*To all whom it may concern:*

Be it known that I, CHARLES H. ALAPAW, of St. Louis, Missouri, have made a new and useful Improvement in Compasses, of which the following is a full, clear, and exact description, reference being had to the annexed drawings, making part of this specification, in which—

Figure 1 is a side elevation showing the improvement; Fig. 2, an edge elevation; and Fig. 3, a side elevation, partly in vertical section, the section being on the line 3 3 3 3 of Fig. 2.

The same letters of reference denote the same parts.

The present invention is an improvement on that class of compasses in which the compass-legs are operated by means of a screw-rod working through the upper end of the compass.

The improvement consists as follows: Instead of pivoting the compass-legs at the top of the compass, they are pivoted, respectively, upon the two lower ends of an inverted-U-shaped yoke, the upper ends of the two arms extending inward and beyond the two pivots, respectively, and their extreme upper ends being pivoted to a screw-rod, which extends upward and engages in a nut held in the upper end of the yoke, and whose function is to raise or lower the screw-rod, and thereby close and open the compass-legs.

A A, Figs. 1, 2, 3, represent the legs of the compass. They are pivoted, respectively, at $a\ a$ to the yoke B, Figs. 1, 3, are extended beyond the pivots inwardly toward each other, and at $a'\ a'$ they are jointed to the lower end of the screw-rod C, which, with the nut D upon its upper end and journaled in the upper end of the yoke, constitutes the mechanism for opening and closing the legs of the compass. The legs of the compass may be considered as two levers having their fulcrums at $a\ a$, the lower ends of the levers being free, and the upper ends of the levers being made to engage, by means of the pivots at $a'\ a'$, with the screw-rod C, which passes upward and engages with the nut D, Figs. 1, 2, 3. This nut being turned to the right or to the left, the screw-rod engaging with it is raised or lowered accordingly, and the upper ends of the lever-rods being pivoted thereto, the lower ends of the lever-rods are moved, thus diminishing or increasing the space between the points of the compass, as may be desired.

E represents a jam-nut, which works upon a screw-thread on that part of the yoke which constitutes the bearing in which the nut is journaled. This jam-nut being turned upward and made to press against the nut D, the latter is secured against turning, and thus the adjustment of the compass is fixed. This improvement is equally applicable to calipers.

I claim—

1. The combination of the legs A A, the yoke B, the screw-rod C, and the nut D, said legs being pivoted to the yoke and extended beyond the pivots inwardly and joined to the screw-rod, substantially as described.

2. The combination of the legs A A, the yoke B, the screw-rod C, the nut D, and the nut E, said legs being pivoted to the yoke and extended beyond the pivots inwardly, and at their ends being jointed to the screw-rod, substantially as described.

CHAS. H. ALAPAW.

Witnesses:
C. D. MOODY,
J. W. HOKE.